United States Patent [19]

Jenkins

[11] 4,367,497

[45] Jan. 4, 1983

[54] DIGITAL DATA FORMATTING SYSTEM FOR HIGH DENSITY MAGNETIC RECORDING

[75] Inventor: Vaughn J. Jenkins, Bountiful, Utah

[73] Assignee: Sperry Corporation, New York, N.Y.

[21] Appl. No.: 222,095

[22] Filed: Jan. 2, 1981

[51] Int. Cl.³ .............................................. G11B 5/09
[52] U.S. Cl. ..................................................... 360/48
[58] Field of Search ............................. 360/40, 48, 49

[56] References Cited

U.S. PATENT DOCUMENTS 3,795,903 4/1974 Lindsey ................................. 360/48

OTHER PUBLICATIONS

"Cartridge Tape Formatter & Interface" by T. G. Bolzno, Navy T.D.B. vol. 4 #8, Aug. 1979.

Primary Examiner—Vincent P. Canney

Attorney, Agent, or Firm—Kenneth T. Grace; John B. Sowell; Marshall M. Truex

[57] ABSTRACT

Digital data is arranged into records for high density recording on a moving magnetic tape or other magnetic medium. A preamble and a postamble are formatted around a variable length data block to form a record for recording onto a movable magnetic medium. A unique character having a mirror image the same as the character is formatted after the preamble and before the postamble in order to allow recognition of the data when read in either forward or reverse direction. A flux change signal is always recorded in a ninth cell position of each character of the preamble, the postamble, the data and all other characters to be recorded, except in the ninth cell position of the unique character to insure a maximum of nine cell positions between successive clock signals and to permit immediate recognition of the end of a data block upon reading the unique character.

8 Claims, 3 Drawing Figures

4,367,497

DIGITAL DATA FORMATTING SYSTEM FOR HIGH DENSITY MAGNETIC RECORDING

BACKGROUND OF THE INVENTION

This invention relates to high density recording of digital data on a movable magnetic medium and particularly to such recording on a magnetic tape where some variation of speed in its movement is inevitable.

Various codes have been employed in efforts to achieve high density recording on magnetic media. Some of these codes and their general defining parameters, $F(X, Y)$ where X is the minimum number of possible locations passed in order to encounter a flux change and Y is the maximum, are:

F(3, 12) for 3PM (three position modulation)
F(1, $\infty$) for NRZI (nonreturn to zero)
F(1, 2) for MPE (Manchester phase encoded)
F(2, 4) for MFM
F(2, 5) for 6250 type group encoding
F(1, 17) for ENRZ While 3PM achieves high bit efficiency, three bits per two flux changes, the application to tape systems generally produces unsatisfactory error rates because of the three position windows for each bit cell, or cell position, combined with tape speed variation. On high performance disc systems the 3PM code may be satisfactory. The present invention combines some of the advantages of the above codes without the disadvantages and at the same time has more tolerance of speed variations. The NRZI code is desirable in that the allowable time window for flux change occurrence encompasses one complete bit cell; however, the maximum number of possible cell positions, or locations, between flux changes is unbounded. MFM overcomes this by inserting an extra flux change between recurring zeros, but in doing so divides the observation window by two. MFM, 3PM and other codes require read recovery systems with sampling error corrections to the timing recovery. With 3PM this time base sampling may be as many as twelve possible locations apart.

Enhanced NRZ or ENRZ which is NRZI with a parity bit every ninth location has been used with some success; however, the maximum number of possible locations between flux changes is sixteen. The present invention employs a new code having similar efficiency, one bit per flux change, to ENRZ with eight bits of data resulting from nine bits of code. This provides eight bits per nine flux changes. However, ENRZ has a possible sixteen windows with no flux change where the code employed in the present invention has a maximum of nine. The code employed in the present invention also provides a recognizable character framing bit in that the ninth bit is always a flux change. Error checking codes are provided by block cyclic redundancy check (CRC) characters. The present invention employs the above described code hereinafter referred to as NRZJ in combination with a unique character at the end of the preamble and at the beginning of the postamble to a block of data to achieve a record suitable for bi-directional reading, suitable for providing a clock signal with no more than nine locations therebetween and suitable for providing recognition of the end of a data block immediately upon the reading of the unique character.

It is therefore an object of the present invention to provide an improved system for arranging digital data for high density recording on a movable magnetic medium.

Another object is to provide such a system with improved clocking signal generating ability.

Another object is to provide such a system with an improved ability to recognize the end of a block of data.

Another object is to provide such a system with recognizable signals for framing the significant portion of each character of data.

Still another object is to provide such a system with recognizable characters framing each block of data.

These and other objects of the present invention will be apparent to those skilled in the art from the description of the invention in connection with the drawings.

SUMMARY OF THE INVENTION

The invention provides a system for formatting digital data for high density recording on movable magnetic media. Means are provided for formatting a preamble and postamble around a block of digital data to form a record suitable for recording. A change of flux signal is formatted into a ninth position of each preamble, postamble and data character. An unique character is formatted into the record after each preamble and before each postamble.

Clock signals and end-of-data signals may be derived from the record. The system also enables bi-directional reading of the record to locate the data block.

DETAILED DESCRIPTION OF A PREFERRED EMBODIMENT

Figure 1:
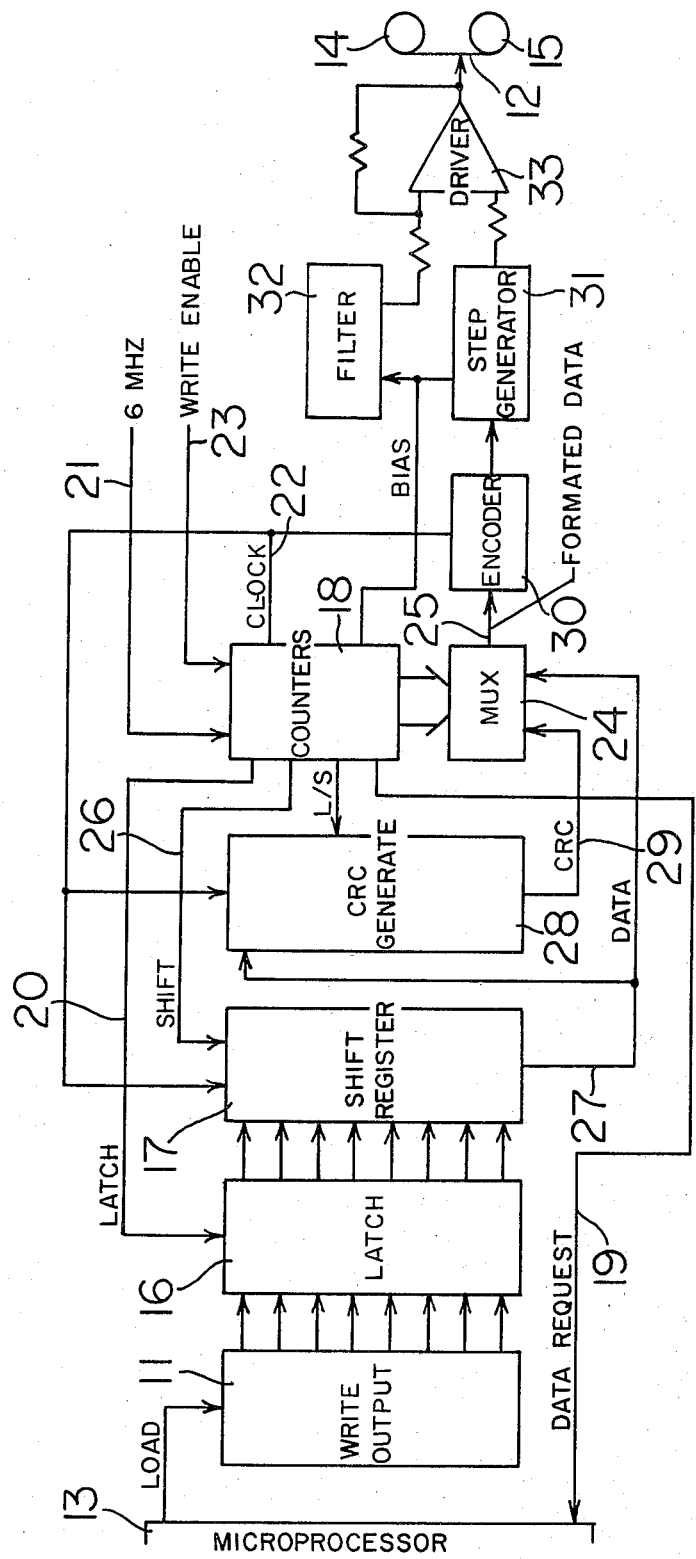
FIG. 1 is a block diagram of a system for arranging digital data into a record for high density recording in accordance with the present invention.
Figure 2:
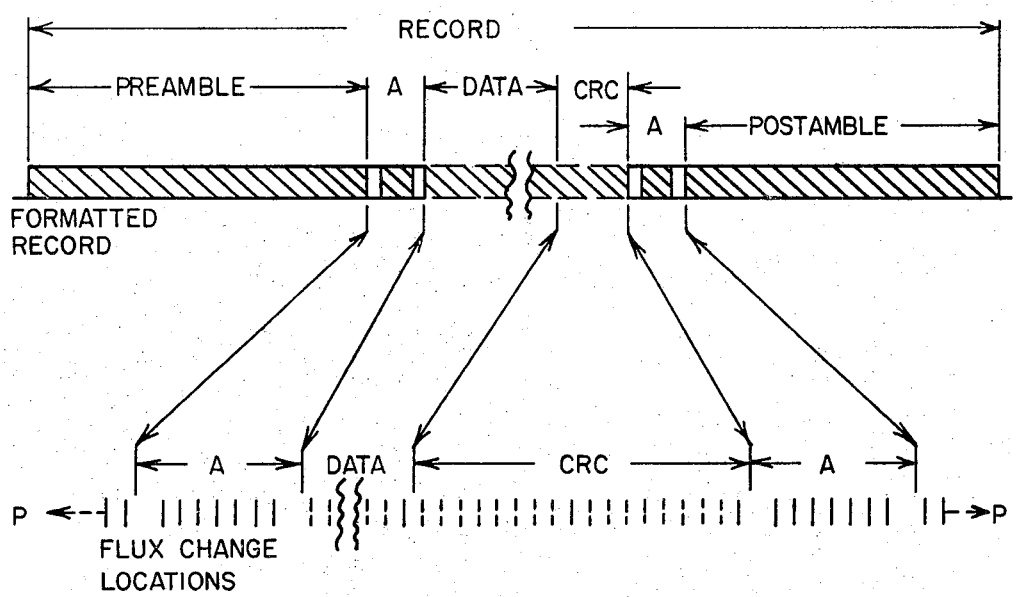
FIG. 2 is a representation of a formatted record of digital data as arranged by the system of FIG. 1.

Referring to FIG. 1 there is shown a system for arranging digital data from a source 11 into records, as depicted in FIG. 2, for high density recording on a movable magnetic medium 12. The various components of the system shown in FIG. 1 are known in the art and are thus not given in detail here. A microprocessor 13 is arranged such that its output register 11 serves as the source of data desired to be recorded on the movable magnetic medium 12. Medium 12 is preferably a magnetic tape bi-directionally movable between supply and take-up reels 14 and 15 under control of microprocessor 13 all as is well known in the art. An eight bit character of digital data is taken from register 11 and temporarily held in latch 16 until it is loaded into a shift register 17. The operation of the system is under control of a group of counters 18. At a particular count of one of the counters 18, a data request is transmitted over line 19 to the microprocessor 13 causing microprocessor 13 to load its output register 11. Another count from the group of counters 18 produces a signal over line 20 to temporarily latch the output from register 11 into latch 16, and the output is in turn loaded into shift register 17 all as is known in the art. Counters 18 are driven by a 6 MHz. signal from an appropriate oscillator over line 21 and in turn counters 18 also produce clock signals over line 22 applied to time various parts of the system.

The function of shift register 17 is to serialize the data appearing in parallel by bit form in register 11. In arranging digital data supplied by microprocessor 13 into a record for high density recording on medium 12, a preamble consisting of fifteen characters of all "ones" is provided. A "one" is defined as a flux change signal. The operation is initiated by a write-enable signal appearing on line 23 going to the counters 18. The write-enable signal will typically be generated by the microprocessor when it is desired to record data on medium 12. This write-enable signal starts the counters 18 which in turn control the system to produce a record for high density recording. On receiving the write-enable signal over line 23, counters 18 control a multiplexer 24 to produce a string of fifteen characters containing all "ones". This is accomplished by counters 18 repeatedly counting through nine cell positions fifteen times, e.g., fifteen character counts, while the multiplexer 24 is controlled to produce the high output indicative of "ones" as may be seen in part of the waveform for data in FIG. 3 where "ones" are indicated. Counters 18 also cause multiplexer 24 to produce a high output during the ninth cell position of the data characters to thus enable eventual recording of flux changes on movable magnetic medium 12 in the NRZJ code. Counters 18 may, for example, be made up of 15490, 54S112 and 54161 types and multiplexer 24 may be of the 54151 type. Upon production of the fifteen characters containing all "ones" by counters 18 controlling multiplexer 24, a unique character is next produced by counters 18 and multiplexer 24 in a similar way; however, in this unique character the high state output of multiplexer 24 is prevented at cell positions one and nine. Counters 18 control multiplexer 24 to produce a "zero" level output for one cell position count followed by seven cell positions containing a symmetrical group of flux change signals preferably a "one" level output for seven cell position counts and then followed by a "zero" level output for the ninth cell position count. The output of multiplexer 24 is taken over line 25 as the formatted data. Once the unique character just described is produced, counters 18 are advanced to produce a shift signal over line 26 to shift register 17 to cause shift register 17 to respond to clock signals from line 22 and shift its contents out serially over line 27 to multiplexer 24. Multiplexer 24 passes the serialized data from line 27 on to its output and over line 25 along with a "one" in the ninth position. A character is reloaded into shift register 17 after each character is shifted out until the entire data block is taken from microprocessor 13. Each successive character loaded into shift register 17 is shifted out to and through multiplexer 24 under control of counters 18 as just described until the entire data block is formatted into the record.

The data bits appearing on line 27 are also fed to a cyclic redundancy check character generator 28 to produce a cyclic redundancy check (CRC) character. The generation and use of such characters to check the accuracy of transmitted data is well known in the art but is essentially a modulo count of the "ones" or "zeros" in the stream of data. After the data is formatted into the record, counters 18 control CRC generator 28 to transmit its content over line 29 to and through multiplexer 24 and over line 25, also along with a flux change signal in the ninth position of each character. The CRC character is thus formatted into the record after the significant data and prior to the unique character preceding the postamble.

After the CRC character is arranged in the record on line 25, counters 18 again control multiplexer 24 to produce and place on line 25 another unique character as described above. After this second unique character has been produced, counters 18 again control multiplexer 24 to produce and place on line 25 fifteen characters made up entirely of "ones" as described above. These fifteen characters of all "ones" make up the postamble and complete the record for high density recording on medium 12.

The record formatted as described above and appearing on line 25 is encoded by an encoder 30, and shaped and amplified by step generator 31, filter 32 and driver 33 for recording on medium 12 as is known in the art.

Figure 3:
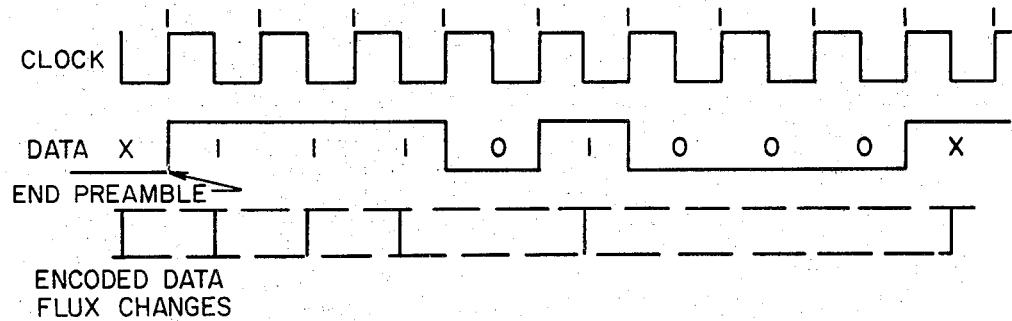
FIG. 3 is a representation of the arrangement of a single character of data in the NRZJ code employed in the present invention.

An encoded representative data character from encoder 30 is depicted in FIG. 3. It may be seen from FIG. 3 how clock signals from line 22 are combined by encoder 30 with the formatted data on line 25 to produce the flux changes utilized to form the magnetizing signal recorded on medium 12.

Referring to FIG. 2 the formatted record produced as described above is depicted. Various parts of the formatted record are expanded to more clearly show their relationship and to more clearly show how the unique character and the NRZJ code employed in the present invention cooperate to produce a record from which clocking signals may be derived at least every ninth cell position (in all cases, except when a unique character is involved and then at least every tenth cell position) and how the end of a data block may be immediately recognized upon reading the unique character. The unique character, designated A in FIG. 2 is unique in that it is the only character ever present that does not have a "one" in its ninth position. It may also be seen from FIG. 3 how the significant portion of each character is framed by recognizable signals, e.g., the "one" formatted into the ninth position (indicated by an "X") of every character, except the unique character. The "one" is formatted on to the end of each eight bit data character shifted out of shift register 17 in FIG. 1 by counters 18 acting on multiplexer 24 during a ninth count in counters 18 which ninth count is not occupied by an output from shift register 17. Similarly, counters 18 and multiplexer 24 format a "one" onto the CRC, preamble and postamble characters.

It may also be seen from FIG. 2 how the data block, including its redundancy check character, is framed by the unique characters permitting recognition of the data block when read with either direction of movement of medium 12.

While a particular embodiment of the invention has been shown and described, modifications may be made within the spirit and scope of the invention; and it is intended in the appended claims to cover such modifications.

What is claimed is:

1. In a system for arranging digital data into records for high density recording on a movable magnetic medium, including; a source of data; generating means for generating a preamble, a postamble and other characters; means for formatting data from said source between said preamble and said postamble and for formatting certain of said other characters with said preamble, said postamble and said data to form each of said records for encoding and recording on said magnetic medium; wherein said preamble and postamble are each comprised of a predetermined number of predetermined characters and said data is comprised of a variable number of characters, said characters each comprised of nine cell positions in which each cell position is adapted to accommodate a flux change signal, the improvement comprising:

first means for conditioning said formatting means to insert an unique one of said other characters at the end of said preamble and at the beginning of said postamble, said unique one of said other characters consisting of a cell position containing no flux change signal followed by seven cell positions containing a symmetrical group of flux change signals in turn followed by a cell position containing no flux change signal;

second means for conditioning said formatting means to insert a flux change signal in the ninth position of every character in said record, except in the ninth position of said unique one of said other characters, whereby a clocking signal may be derived from at least every tenth cell position in said record and whereby the end of the data contained in a record may be immediately recognized upon reading said unique one of said other characters.

2. The invention according to claim 1 wherein said unique one of said other characters consists of a first cell position containing no flux change signal followed by seven cell positions each containing a flux change signal and in turn followed by a ninth cell position containing no flux change signal.

3. The invention according to claim 2 wherein said generating means includes means for generating a cyclic redundancy check character and wherein said formatting means includes means for formatting said check character between said data and the said unique one of said other characters preceding said postamble.

4. The invention according to claim 3 further characterized by the provision of means for encoding said flux change signals and means responsive thereto for generating signals suitable for recording on said magnetic medium.

5. The invention according to claim 3 wherein said unique one of said other characters may be recognized by reading said magnetic medium when said magnetic medium is moving in either one of two directions.

6. The invention of claim 5 wherein said data and said cyclic redundancy check character are framed by said unique ones of said other characters.

7. The invention of claim 6 whereby high density recording with speed tolerance is provided for a movable magnetic medium.

8. The invention of claim 7 wherein the significant portion of each character is framed by the flux change signal formatted into said ninth cell position.

* * * * *